Sept. 19, 1967  M. W. GUSTAFSON  3,341,922
DETACHABLE CLAMPING ARRANGEMENT FOR A REVERSIBLE CUTTING BIT
Filed Feb. 17, 1966

INVENTOR.
MANFRED WALLACE GUSTAFSON
BY
HIS ATTORNEYS

United States Patent Office 3,341,922
Patented Sept. 19, 1967

3,341,922
DETACHABLE CLAMPING ARRANGEMENT FOR A REVERSIBLE CUTTING BIT
Manfred Wallace Gustafson, Fagersta, Sweden, assignor to Fagersta Bruks Aktiebolag, Fagersta, Sweden
Filed Feb. 17, 1966, Ser. No. 528,149
Claims priority, application Sweden, Feb. 19, 1965, 2,205/65
8 Claims. (Cl. 29—96)

The present invention relates to a detachable clamping arrangement for a cutting bit, preferably a reversible cutting bit, requiring a bit holder of very simple construction. These simple bit holders, which in existing cases are equipped with a non-adjustable chip breaker, are utilized first and foremost in mass production, where few retoolings occur, as for instance in the automobile industry. Due to the very simple construction of the holder, a tool of great versatility can be obtained and through this replace an ever increasing number of tools with brased hard metal bits.

The object is to arrange on a very limited space a clamping device of the cutting bit, which clamping device meets the requirements placed thereon. The cutting bit, with on without chip breaker, when it is being clamped shall be fixed against its contact and support faces with a bearing force adjusted to the requirements.

The above mentioned requirements are fulfilled in an arrangement according to the invention, which more closely defined, relates to a detachable clamping arrangement for the clamping of a cutting bit in a recess in a holder member for the cutting bit, which recess corresponds to the shape of the cutting bit, said cutting bit being kept in place in the recess by means of the head on a bolt screwed into a tapped hole in the holder member, and which is essentially characterized in, that the tapped hole is so oriented, that the longitudinal axis of the bolt inclines in relation to the upper surface of the cutting bit, and is so situated that after the clamping of the cutting bit, by tightening the bolt, said cutting bit is held pressed against the side faces of the recess.

The recess situated in the bit holder member is limited by a lower face and at least two side faces. Usually a packing piece is situated in this recess and on the top of said packing piece the cutting bit and possibly a chip breaker on the cutting bit. The bit holder lacks an overhang in the usual sense and the bolt head serves as an overhang and clamps the cutting bit in the desired position.

On tightening the bolt a lateral force is created which thrusts the cutting bit and the chip breaker, when it is provided, against their support faces in the recess and fixes their position. The compressive force of the bolt presses the cutting bit against its packing piece. This force, by reason of the inclination of the bolt, is transmitted partially as spring force, which causes the said fixing of the cutting bit besides locking the bolt.

The significance of the arrangement is, that the compressive force on the bolt is effectively utilized, in addition to the spring force, which together act upon the dimensioning of the bolt. The construction is simple and thereby cheap in manufacture as well as in regard to the keeping of spare parts stock.

In a preferred embodiment, the upper part of the hole situated nearest the bolt head is shaped as a cylindrical blank hole with a somewhat larger diameter than the diameter of the tapped part of the hole. The screw is therefore running free in the part nearest the bolt head, which contributes to a greatly increased and more effective clamping.

According to the invention, the underside of the bolt head can be provided with a chamfered face all around to allow linear abutment.

The invention will be described more closely below with reference to the accompanying drawing which shows embodiments of the same.

Figure 3:
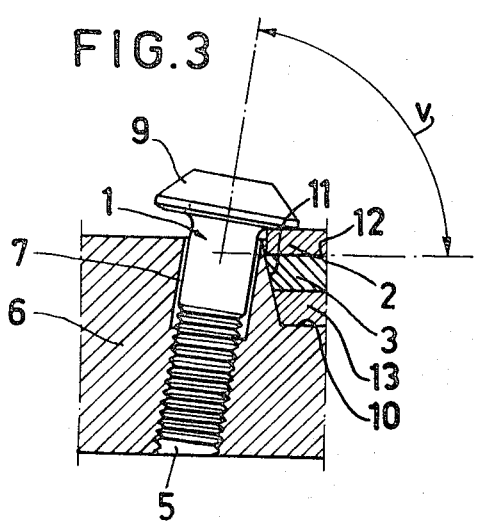
FIG. 3 shows a section along the line A—A in FIG. 1 or 2.
Figure 4:
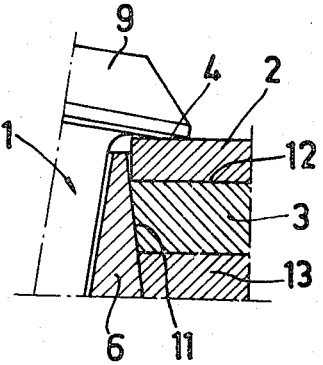

FIG. 4 finally, shows on a large scale, a part of FIG. 3.

Figure 1:
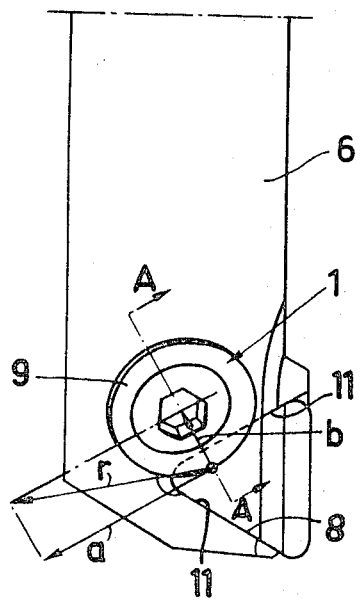
FIG. 1 shows a cutting bit holder of the knife steel type seen in a plan view.

In all drawings figures 1 designates a screw which for clamping a cutting bit 3, with a chip breaker 2 unadjustable in relation to the bit, in a recess 8 having a bottom face 10 and side faces 11 is screwed into a tapped hole 5 in the holder member 6. The cutting bit 3 is situated on a packing piece 13. The longitudinal axis of the bolt 1 forms an acute angle $v$ to the plane or the upper face 12 of the cutting bit or the chip breaker. The lower surface of the bolt head 9 is provided with a chamfer 4 which provides linear contact against the chip breaker (or the cutting bit). The part of the hole 5 nearest the bolt head is shaped as a cylindrical bore 7 with a diameter somewhat larger than the diameter of the tapped part of the hole.

Figure 2:
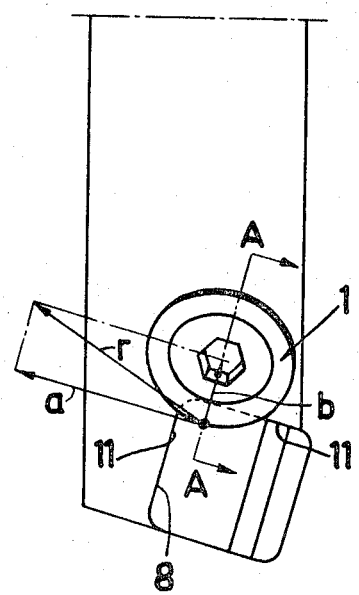
FIG. 2 shows a cutting bit holder of the roughing steel type in a plan view.

Tightening the bolt 1, which in this case has a right hand thread, causes movement of the chip breaker 2 and the cutting bit 3 in the direction $a$ shown in FIGS. 1 and 2, whereby the bore 7 also allows the bolt a movement in the direction $b$.

The magnitude of the said movement, thus, is defined by the play of the thread, the diameter of the cylindrical bore and to some degree the elasticity of the bolt. The two movement components $a$ and $b$ form a movement resultant $r$, which thrusts the chip breaker and the cutting bit respectively in the desired direction, i.e. towards the corner between the side faces 11 of the recess 8.

The holder of knife steel type shown in FIG. 1 with a positive triangular bit, and the holder of roughing steel type shown in FIG. 2 with a square bit, each being provided with chip breaker, are of course only examples of embodiments. The holder can be constructed according to all existing types, it can also be equipped with cutting bits of other convenient design, in addition to those shown, and further it can, for materials producing short chips, be equipped solely with cutting bits, i.e., without chip breakers. The cutting bit is preferably a reversible cutting bit. Moreover, a bolt which has a left or a right hand thread can be utilized, depending on the construction of the holder, but always such that the bolt, during tightening, thrusts the cutting bit against the side faces of the recess.

What I claim is:

1. A holder for detachably mounting a bit having a cutting face and at least two angularly related side faces, comprising a holder member having a recess adjacent one end thereof for receiving said bit, said recess having a bottom and two angularly related sides complemental to the angularly related side faces of said bit, a threaded hole in said holder member adjacent to one of said recess sides inclined relative to the adjacent side and bottom of said recess, and a bolt having a shank threaded into said hole and a head with an edge portion overlying said recess, the inclination of said threaded hole and said bolt and the direction of the threads being related to urge said side faces of said bit against said sides of said recess when said bolt is screwed into said hole.

2. The holder according to claim 1 wherein said threaded hole comprises a cylindrical portion adjacent to the head of said bolt of larger diameter than said shank of said bolt.

3. The holder according to claim 1 comprising a chip breaker overlying said bit and engageable by said edge portion of said bolt.

4. The holder according to claim 2 comprising a chip breaker overlying said bit and engageable by said edge portion of said bolt.

5. The holder according to claim 1 wherein said edge portion of said bolt head engages said cutting bit.

6. The holder according to claim 2 wherein said edge portion of said bolt head engages said cutting bit.

7. The holder according to claim 3 wherein said bolt head has a chamfered under surface for linear engagement with said chip breaker.

8. The holder set forth in claim 5 wherein said bolt head has a chamfered under surface for linear engagement with said bit.

References Cited
UNITED STATES PATENTS

| | | | |
|---|---|---|---|
| 3,173,191 | 3/1965 | Alexander | 29—96 |
| 3,200,473 | 8/1965 | Bader | 29—96 |
| 3,246,382 | 4/1966 | Zierden | 29—96 |

HARRISON L. HINSON, *Primary Examiner.*